US008544098B2

(12) United States Patent
Gustave et al.

(10) Patent No.: US 8,544,098 B2
(45) Date of Patent: *Sep. 24, 2013

(54) SECURITY VULNERABILITY INFORMATION AGGREGATION

(75) Inventors: Christophe Gustave, Ottawa (CA); Stanley TaiHai Chow, Ottawa (CA); Douglas Wiemer, Ashton (CA)

(73) Assignee: Alcatel Lucent, Paris (FR)

( * ) Notice: Subject to any disclaimer, the term of this patent is extended or adjusted under 35 U.S.C. 154(b) by 1537 days.

This patent is subject to a terminal disclaimer.

(21) Appl. No.: 11/366,319

(22) Filed: Mar. 2, 2006

(65) Prior Publication Data

US 2007/0067848 A1 Mar. 22, 2007

Related U.S. Application Data

(63) Continuation-in-part of application No. 11/232,004, filed on Sep. 22, 2005.

(51) Int. Cl.
*G08B 23/00* (2006.01)
(52) U.S. Cl.
USPC .................................. 726/25; 726/1; 709/224
(58) Field of Classification Search
USPC .................................. 726/22–25, 1; 713/188
See application file for complete search history.

(56) References Cited

U.S. PATENT DOCUMENTS

| | | | |
|---|---|---|---|
| 5,751,965 A | 5/1998 | Mayo et al. | |
| 5,850,516 A | 12/1998 | Schneier | |
| 6,125,453 A | 9/2000 | Wyss | |
| 6,282,546 B1 | 8/2001 | Gleichauf et al. | |
| 6,298,445 B1 | 10/2001 | Shostack et al. | |
| 6,301,668 B1 | 10/2001 | Gleichauf et al. | |
| 6,321,338 B1 | 11/2001 | Porras et al. | |
| 6,535,227 B1 | 3/2003 | Fox et al. | |
| 6,782,421 B1 | 8/2004 | Soles et al. | |
| 6,883,101 B1 | 4/2005 | Fox et al. | |
| 6,895,383 B2 | 5/2005 | Heinrich | |
| 6,907,531 B1 | 6/2005 | Dodd et al. | |
| 6,990,591 B1 | 1/2006 | Pearson | |
| 7,003,561 B1 | 2/2006 | Magdych et al. | |
| 7,152,105 B2 | 12/2006 | McClure et al. | |

(Continued)

FOREIGN PATENT DOCUMENTS

| | | |
|---|---|---|
| WO | WO 01/60024 A2 | 8/2001 |
| WO | WO 02/054325 A2 | 7/2002 |

OTHER PUBLICATIONS

Polepeddi, S., "Software Vulnerability Taxonomy Consolidation", XP-002457428, UCRL-TH-208822, Jan. 4, 2005, 41 pp.

(Continued)

*Primary Examiner* — Kambiz Zand
*Assistant Examiner* — Amare F Tabor
(74) *Attorney, Agent, or Firm* — Eckert Seamans Cherin & Mellott, LLC

(57) ABSTRACT

Security vulnerability information aggregation techniques are disclosed. Vulnerability information associated with one or more security vulnerabilities is obtained from multiple sources and aggregated into respective unified vulnerability definitions for the one or more security vulnerabilities. Aggregation may involve format conversion, content aggregation, or both in some embodiments. Unified vulnerability definitions may be distributed to vulnerability information consumers in accordance with consumer-specific policies. Storage of vulnerability information received from the sources may allow the aggregation process to be performed on existing vulnerability information "retro-actively". Related data structures and Graphical User Interfaces (GUIs) are also disclosed.

15 Claims, 7 Drawing Sheets

(56) References Cited

U.S. PATENT DOCUMENTS

| | | |
|---|---|---|
| 7,240,213 B1 | 7/2007 | Ritter |
| 7,243,148 B2 | 7/2007 | Keir et al. |
| 7,257,630 B2 | 8/2007 | Cole et al. |
| 7,299,489 B1 | 11/2007 | Branigan et al. |
| 7,308,712 B2 * | 12/2007 | Banzhof .......................... 726/22 |
| 7,340,776 B2 | 3/2008 | Zobel et al. |
| 7,359,962 B2 | 4/2008 | Willebeek-LeMair et al. |
| 7,372,809 B2 | 5/2008 | Chen et al. |
| 7,376,969 B1 * | 5/2008 | Njemanze et al. ............... 726/22 |
| 7,451,488 B2 | 11/2008 | Cooper et al. |
| 7,523,504 B2 | 4/2009 | Shah |
| 8,201,257 B1 | 6/2012 | Andres et al. |
| 2002/0078381 A1 * | 6/2002 | Farley et al. ................... 713/201 |
| 2002/0138416 A1 | 9/2002 | Lovejoy et al. |
| 2002/0199122 A1 | 12/2002 | Davis et al. |
| 2003/0046582 A1 * | 3/2003 | Black et al. .................... 713/201 |
| 2003/0097588 A1 | 5/2003 | Fischman et al. |
| 2003/0126466 A1 | 7/2003 | Park et al. |
| 2003/0126472 A1 | 7/2003 | Banzhof |
| 2003/0154269 A1 * | 8/2003 | Nyanchama et al. .......... 709/223 |
| 2003/0154393 A1 | 8/2003 | Young |
| 2003/0154404 A1 * | 8/2003 | Beadles et al. ................. 713/201 |
| 2003/0212909 A1 | 11/2003 | Chandrashekhar et al. |
| 2003/0233438 A1 | 12/2003 | Hutchinson et al. |
| 2004/0010571 A1 | 1/2004 | Hutchinson et al. |
| 2004/0093513 A1 | 5/2004 | Cantrell et al. |
| 2004/0102922 A1 | 5/2004 | Tracy et al. |
| 2004/0143753 A1 | 7/2004 | Hernacki et al. |
| 2004/0168086 A1 | 8/2004 | Young et al. |
| 2004/0221176 A1 | 11/2004 | Cole |
| 2005/0010819 A1 | 1/2005 | Williams et al. |
| 2005/0010821 A1 | 1/2005 | Cooper et al. |
| 2005/0015672 A1 | 1/2005 | Yamada |
| 2005/0022021 A1 | 1/2005 | Bardsley et al. |
| 2005/0039046 A1 | 2/2005 | Bardsley et al. |
| 2005/0080720 A1 | 4/2005 | Betz et al. |
| 2005/0091542 A1 | 4/2005 | Banzhof |
| 2005/0114186 A1 | 5/2005 | Heinrich |
| 2005/0160480 A1 | 7/2005 | Birt et al. |
| 2005/0177746 A1 | 8/2005 | Bunn et al. |
| 2005/0193430 A1 | 9/2005 | Cohen et al. |
| 2005/0257269 A1 | 11/2005 | Chari et al. |
| 2006/0005245 A1 | 1/2006 | Durham et al. |
| 2006/0010497 A1 | 1/2006 | O'Brien et al. |
| 2006/0021044 A1 | 1/2006 | Cook |
| 2006/0101519 A1 * | 5/2006 | Lasswell et al. ................ 726/25 |
| 2006/0136327 A1 | 6/2006 | You |
| 2006/0156407 A1 | 7/2006 | Cummins |
| 2006/0191012 A1 | 8/2006 | Banzhof et al. |
| 2007/0016955 A1 | 1/2007 | Goldberg et al. |
| 2007/0067847 A1 | 3/2007 | Wiemer et al. |
| 2007/0113265 A2 | 5/2007 | Oliphant |
| 2009/0076969 A1 | 3/2009 | Sparks |

OTHER PUBLICATIONS

Böhme, R., "A Comparison of Market Approaches to Software Vulnerability Disclosure", Emerging Trends in Information and Communication Security Lecture Notes in Computer Science;;LNCS, Springer-Verlag, BE, vol. 3995, 2006, pp. 298-311.
Stoneburner, G. et al., "Risk Management Guide for Information Technology Systems", NIST National Institute of Standards and Technology, XP007914492, Special Publication 800-30, Jul. 2002, 55 pp.
Sufatrio, et al., "A Machine-Oriented Integrated Vulnerability Database for Automated Vulnerability Detection and Processing", 2004 LISA XVIII—Nov. 14-19, 2004, pp. 47-57.
USPTO, US Final Office Action for U.S. Appl. No. 11/366,101, May 12, 2011, 31 pages.
USPTO, US Non-Final Office Action for U.S. Appl. No. 11/366,101, Oct. 28, 2010, 28 pages.
USPTO, US Final Office Action for U.S. Appl. No. 11/366,101, Jun. 3, 2010, 28 pages.
USPTO, US Non-Final Office Action for U.S. Appl. No. 11/366,101, Dec. 9, 2009, 31 pages.
USPTO, US Non-Final Office Action for U.S. Appl. No. No. 11/366,101, May 26, 2009, 23 pages.
USPTO, US Final Office Action for U.S. Appl. No. 11/366,100, Feb. 3, 2011, 31 pages.
USPTO, US Non-Final Office Action for U.S. Appl. No. 11/366,100, Aug. 25, 2010, 33 pages.
USPTO, US Final Office Action for U.S. Appl. No. 11/366,100, Apr. 12, 2010, 43 pages.
USPTO, US Non-Final Office Action for U.S. Appl. No. 11/366,100, Dec. 7, 2009, 31 pages.
USPTO, US Non-Final Office Action for U.S. Appl. No. 11/366,100, May 14, 2009, 23 pages.
USPTO, US Final Office Action for U.S. Appl. No. 11/131,598, Aug. 28, 2009, 13 pages.
USPTO, US Non-Final Office Action for U.S. Appl. No. 11/131,598, Mar. 13, 2009, 12 pages.
USPTO, US Final Office Action for U.S. Appl. No. 11/132,118, Aug. 20, 2009, 10 pages.
USPTO, US Non-Final Office Action for U.S. Appl. No. 11/132,118, Jan. 22, 2009, 10 pages.
USPTO, US Non-Final Office Action for U.S. Appl. No. 11/232,004, Apr. 23, 2010, 21 pages.
USPTO, US Non-Final Office Action for U.S. Appl. No. 11/232,004, Nov. 27, 2009, 8 pages.
USPTO, US Final Office Action for U.S. Appl. No. 11/232,004, May 15, 2009, 25 pages.
USPTO, US Non-Final Office Action for U.S. Appl. No. 11/232,004, Dec. 9, 2008, 22 pages.
EPO, Decision to refuse a European Patent Application (Form 2007) for European Patent Application No. 06 300 970.8, Mar. 3, 2011, 10 pages.
EPO, Summons to attend oral proceedings pursuant to Rule 115(1) EPC for European Patent Application No. 06 300 970.8, Sep. 9, 2010, 7 pages.
EPO, Communication pursuant to Article 94(3) EPC for European Patent Application No. 06 300 970.8, Feb. 13, 2009, 1 page.
EPO, Extended European Search Report for European Patent Application No. 06 300 970.8, Jun. 4, 2008, 18 pages.
EPO, Partial European Search Report for European Patent Application No. 06 300 970.8, Nov. 12, 2007, 5 pages.
EPO, Communication pursuant to Article 94(3) EPC for European Patent Application No. 06 300 978.1, Jan. 20, 2011, 10 pages.
EPO, Summons to attend oral proceedings pursuant to Rule 115(1) EPC for EPO, European Patent Application No. 06 300 978.1, Sep. 9, 2010, 6 pages.
EPO, Communication pursuant to Article 94(3) EPC for European Patent Application No. 06 300 978.1, Jul. 31, 2008, 1 page.
EPO, Extended European Search Report for European Patent Application No. 06 300 978.1, Dec. 3, 2007, 8 pages.
EPO, Summons to attend oral proceedings pursuant to Rule 115(1) EPC for European Patent Application No. 06 300 971.6, Sep. 9, 2010, 5 pages.
EPO, Communication pursuant to Article 94(3) EPC for European Patent Application No. 06 300 971.6, Nov. 20, 2008, 1 page.
EPO, Extended European Search Report for European Patent Application No. 06 300 971.6, Mar. 26, 2008, 12 pages.
EPO, Partial European Search Report for European Patent Application No. 06 300 971.6, Dec. 6, 2007, 4 pages.
EPO, Extended European Search Report for European Divisional Patent Application No. 10 183 806.8, Jan. 12, 2011, 4 pages.
Notification of the First Office Action for Chinese Patent Application No. 200610168913.X with English Translation, Jul. 3, 2009, 10 pages.
Decision of Rejection for Chinese Patent Application No. 200610168913.X with English Translation, Feb. 5, 2010, 10 pages.
Notification of the First Office Action for Chinese Patent Application No. 200610144429.3 with English Translation, Aug. 3, 2010, 12 pages.
Notification of the second Office Action for Chinese Patent Application No. 200610144762.4 with English Translation, Feb. 5, 2010, 9 pages.

Notification of the First Office Action for Chinese Patent Application No. 200610144762.4 with English Translation, Jun. 5, 2009, 23 pages.

International Standard, "Information technology—Security techniques—Evaluation criteria for IT security—Part 1: Introduction and general model," ISO/IEC 15408-1:1999(E), First Edition Dec. 1, 1999, 62 pp.

Wu, William et al., Integrated Vulnerability Management System for Enterprise Networks, E-Technology, E-Commerce and E-Service, 2005. EEE '05. Proceedings. The 2005 IEEE International Conference on Hong Kong, China Mar. 29-01, 2005, Piscataway, NJ, USA, IEEE, Mar. 29, 2005, pp. 698-703.

Young-Hwan Bang, Yoon-Jung Jung, Injung Kim, Namhoon Lee, Gang-Soo Lee: "The Design and Development for Risk Analysis Automatic Tool" Online, [Online] 2004, pp. 491-499, XP002400108. Retrieved from the internet: URL:http://springerlink.metapress.com/content/1a5017n9txrumuur/fulltext.pdf> whole document.

Jansen, A. et al., "Adopting Internet-Centric Technologies in Network Management: The Internet has spawned a number of new technologies which are increasingly being used to enhance network and service management" Alcatel Telecommunications Review, Alcatel, Paris Cedex, FR, Jul. 2003 XP007005936 ISSN: 1267-7167, 10 pp.

Farahmand et al., Managing Vulnerabilities of Information Systems to Security Incidents, ICEC 2003, ACM 1-58113, pp. 348-354.

Apostolakis, G.E. et al., "A Screening Methodology for the Identification and Ranking of Infrastructure Vulnerabilities Due to Terrorism", XP-002457051, Risk Analysis, vol. 25, No. 2, 2005, pp. 361-376.

Schiffman, M., "The Common Vulnerability Scoring System", XP-002479898, The RSA Conference, Feb. 2005, 41 pp.

Baybutt, Cyber Security Vulnerability Analysis: An Asset-based approach, Dec. 2003, Process Safety Progress, vol. 22, No. 4. pp. 220-228.

Ferson, S., "Fuzzy arithmetic in risk analysis". Aug. 2003. Available at http://web.archive.org/web/20030822232721/www.ramas.com/fuzzygood.ppt/www.ramas.com/fuzzygood.ppt. Downloaded Sep. 17, 2009, 30 pp.

Stamatelatos, G., "New Thrust for Probabilistic Risk Assessment (PRA) at NASA; Risk Analysis for Aerospace Systems II: Mission Success Starts with Safety". Oct. 28, 2002. Available at http://www.sra.org/docs/Stamatelatos.pdf. Downloaded Sep. 17, 2009, 45 pp.

Hayden, B. et al., "On the Generation of Short Paths and Minimal Cutsets of the Hierarchical Web Graph". Jul. 21, 2005. Available at http://dimax.rutgers.edu/~ehayden/REU%20all1.pdf. Downloaded Sep. 17, 2009, 8 pp.

Fleming, R., "Vulnerability Assessment Using a Fuzzy Logic Based Method". Dec. 7, 1993. Available at http://handle.dtic.mil/100.2/ADA274075. Downloaded Sep. 17, 2009, 101 pp.

Liang, W., Efficient Enumeration of All Minimal Separators in a Graph, Theoretical Computer Science, 180: 169-180, 1997.

Karas, W., C++AVL Tree Template Version 1.3, http://www.geocities.com/wkaras/gen_cpp/avl_tree.html?200522, Aug. 22, 2005.

Maggio, "Space Shuttle Probabilistic Risk Assessment: Methodology & Application", 1996 Proceedings Annual, Reliability and Maintainability Symposium, pp. 121-132, Jan. 25, 1996.

Hong et al., "Efficient enumeration of all minimal separators in a graph", Theoretical Computer Science, Jun. 10, 1997, pp. 169-180, vol. 180, No. 1-2, Australia.

Kloks et al., "Finding all minimal separators in a graph", Proceedings of 11$^{th}$ Symposium of Theoretical Aspects of Computer Science, Feb. 1994, pp. 759-768, Berlin.

Littlewood, B., Broclehurst, S., Fenton, N., Mellor, P., Page, S., Wright, D., Dobson, J., McDermid, J., and Gollman, D. 1993. Towards Operational Measures of Computer Security. J. Comput. Sec. 2, 2. Available at http://www.csr.city.ac.uk/people/bev.littlewood/bl_public papers/Measurement of security/Quantitative_security.pdf. Downloaded Sep. 17, 2009, 24 pp.

"Common Criteria International Standard ISO/IEC 15408:1999". Aug. 1999. Available at http://www.niap-ccevs.org/cc-scheme/cc_docs/cc_v21_part1.pdf. Downloaded Sep. 17, 2009, 61 pp.

United States Patent and Trademark Office, "Notice of Allowance and Fee(s) Due", U.S. Appl. No. 11/366,101, Dec. 31, 2012, 4 pp.

United States Patent and Trademark Office, "Notice of Allowability", U.S. Appl. No. 11/366,101, Dec. 31, 2012, 13 pp.

Nagaratnam, N. et al., "Business-driven application security: From modeling to managing secure applications", IBM Systems Journal, 2005, vol. 44, No. 4, pp. 847-867.

* cited by examiner

FIG. 6

SECURITY VULNERABILITY INFORMATION AGGREGATION

CROSS-REFERENCE TO RELATED APPLICATIONS

The present application is related to U.S. patent application Ser. No. 11/131,598, entitled "SECURITY RISK ANALYSIS SYSTEMS AND METHODS", and filed on May 18, 2005, to U.S. patent application Ser. No. 11/132,118, entitled "COMMUNICATION NETWORK SECURITY RISK EXPOSURE MANAGEMENT SYSTEMS AND METHODS", and filed on May 18, 2005, to U.S. patent application Ser. No. 11/366,101, entitled "INFORMATION SYSTEM SERVICE-LEVEL SECURITY RISK ANALYSIS", and filed of even date herewith, and to U.S. patent application Ser. No. 11/366,100, entitled "SYSTEMS AND METHODS OF ASSOCIATING SECURITY VULNERABILITIES AND ASSETS", and filed of even date herewith.

This application also claims the benefit of U.S. patent application Ser. No. 11/232,004, entitled "APPLICATION OF CUT-SETS TO NETWORK INTERDEPENDENCY SECURITY RISK ASSESSMENT", and filed on Sep. 22, 2005, and is a continuation-in-part thereof.

The entire contents of each of the above-identified related applications are incorporated into the present application by reference.

FIELD OF THE INVENTION

This invention relates generally to security vulnerabilities, and in particular, to aggregating vulnerability information from multiple sources.

BACKGROUND

Security advisories are commonly used to describe information system vulnerabilities. These advisories provide information regarding specific characteristics associated with a vulnerability, such as an affected software platform product, remediation patches, a public disclosure date, a type of impact on the affected platform product, and so on.

Currently, there are many vulnerability advisory producers or sources. These sources span different levels of information detail, product vendors, and public or governmental institutions. Each vulnerability advisory source typically has its own proprietary format, which may overlap the formats used by other sources. Some sources may incorporate into their advisories vulnerability information that other sources do not. Various product vendors or security institutions such as the Computer Emergency Response Team—Coordination Centre (CERT/CC) operated by the Carnegie Mellon Software Engineering Institute or the SysAdmin, Audit, Network, Security (SANS) Institute, for instance, produce vulnerability notes on a regular basis. The heterogeneous nature of vulnerability information sources can result in a lack of consistency among vulnerability advisories.

Although there are de-facto standards for various aspects of vulnerability information reporting, not all sources use those standards. Even where multiple sources provide advisories formatted in accordance with the same standard, the particular types and content of the vulnerability information provided by those sources may vary.

The Common Vulnerabilities and Exposures (CVE) scheme gives a unique name to a vulnerability that may have been found by multiple entities. This assures that disparate vulnerability databases will still use a common name for the same vulnerability. CVE provides a way to identify information for the same vulnerability in different data feeds, by associating a specific name with a vulnerability. This name, along with a short description of the vulnerability, is made publicly available via a centralized repository. Vulnerability information sources using the CVE naming scheme can then provide vulnerability information for the same vulnerability using a common name. This approach, however, only links vulnerabilities from different sources, providing all of the sources support the CVE naming scheme, without consolidating the actual content associated with different vulnerabilities identified under the same CVE name. The CVE scheme relates only to vulnerability naming, and does not specify a format or content for vulnerability information that may be associated with a named vulnerability.

The Common Vulnerability Scoring System (CVSS) was developed through the National Infrastructure Advisory Council (NIAC) and is currently administered by the Forum of Incident Response and Security Teams (FIRST). The CVSS provides a common scheme and process for evaluating vulnerabilities according to particular criteria. Although the CVSS scheme is intended to be objective, different entities generally have different experience and knowledge of exploited platforms, for example, such that the same vulnerability may be assigned different CVSS scores by different sources. Further, while the CVSS includes a rating scheme against particular criteria, information details about a vulnerability are still left to the format of each source.

Manually compiling and making consistent vulnerability information from multiple sources, and for an increasing number of new vulnerabilities, is not only labor intensive but also error prone.

In addition to the "formatting" aspects of the problem, there is an additional "historical" aspect. Over time, some of the sources may vanish or relocate to different web site for instance, some advisories may vanish, some may change subscription requirements, and indeed some sources may be "push-only" sources. Given all of these different problems, it is difficult to gather a complete set of the advisories.

Thus, there remains a need for improved vulnerability information handling techniques.

SUMMARY OF THE INVENTION

Having a consistent way to exhaustively inventory and describe vulnerabilities is of critical interest in the area of vulnerability management. Maintaining an up-to-date and accurate view of a vulnerability landscape is a key requirement for cost-effective management of information system security features. With an increasing number of new discovered vulnerabilities, it is becoming desirable to automate this process.

It may also be desirable to allow an aggregation policy, which specifies vulnerability information distribution parameters for vulnerability information consumers, to be changed "retro-actively". For example, although a particular service running on some system may be currently rated as unimportant, subsequent business changes may well make that service critical. This means that a vulnerability that was previously considered not to be important may become critical. In some embodiments of the invention, existing vulnerability information associated with such a vulnerability can be retro-actively aggregated and included in a vulnerability information feed for a customer responsive to a change in the customer's aggregation policy.

Embodiments of the invention relate to aggregating vulnerability information, such as vulnerability advisories, to provide a unified and consolidated view of the vulnerability management landscape.

According to an aspect of the invention, there is provided an apparatus that includes an interface for receiving from a plurality of sources vulnerability information associated with a particular security vulnerability, and an aggregator, operatively coupled to the interface, for receiving the vulnerability information through the interface, and for aggregating the vulnerability information received from the plurality of sources into a unified vulnerability definition associated with the security vulnerability.

The interface may include a plurality of interfaces. Each interface of the plurality of interfaces is configured to receive vulnerability information from a respective group of one or more sources.

The aggregator may include a plurality of format adapters operatively coupled to the interface, with each format adapter being configured to convert a format of vulnerability information received from a respective source into a format of the unified vulnerability definition.

In one embodiment, the aggregator includes a content aggregator operatively coupled to the interface and configured to determine a portion of the unified vulnerability definition based on corresponding portions of the vulnerability information received from the plurality of sources.

The content aggregator may be further configured to detect a conflict between vulnerability information received from different sources of the plurality of sources. In this case, the aggregator may include a conflict resolution module operatively coupled to the content aggregator and configured to resolve a conflict detected by the content aggregator. The content aggregator may also or instead include a conflict alert module operatively coupled to the content aggregator and configured to allow a user to resolve a conflict detected by the content aggregator.

The vulnerability information received from each source may include respective source content arranged according to a respective source format. A plurality of format adapters may be operatively coupled to the interface, and configured to convert vulnerability information from respective source formats into a format of the unified vulnerability definition. A content aggregator operatively coupled to the plurality of format adapters is configured to determine a portion of content in the unified vulnerability definition format based on corresponding portions of source content in the converted vulnerability information received from the plurality of sources.

The apparatus may also include a user interface, operatively coupled to the aggregator, for providing a representation of the unified vulnerability definition.

In some embodiments, the apparatus includes one or more output interfaces operatively coupled to the aggregator. Each output interface is configured to transmit the unified vulnerability definition to a respective group of one or more vulnerability information consumers.

A policies store operatively coupled to the aggregator may store one or more aggregation policies. The one or more aggregation policies specify respective sets of distribution parameters for one or more vulnerability information consumers. Where the interface is configured for receiving from the plurality of sources vulnerability information associated with a plurality of security vulnerabilities, the aggregator may be configured to aggregate received vulnerability information associated with one or more respective security vulnerabilities into one or more respective unified vulnerability descriptions in accordance with the aggregation policy of a vulnerability information consumer in the policies store, and to distribute the one or more respective unified vulnerability descriptions through an output interface of the one or more output interfaces to the vulnerability information consumer.

A vulnerability information store may also be provided, and operatively coupled to the interface and to the aggregator, for storing the vulnerability information associated with the plurality of security vulnerabilities. The aggregator may in this case be further configured to, where an aggregation policy is added to or modified in the policies store, retrieve from the vulnerability information store vulnerability information associated with one or more respective security vulnerabilities in accordance with the new or modified aggregation policy, aggregate the retrieved vulnerability information into one or more respective unified vulnerability descriptions, and distribute the one or more respective unified vulnerability descriptions through an output interface of the one or more output interfaces to a vulnerability information consumer for which the new or modified aggregation policy specifies distribution parameters.

A method according to another aspect of the invention involves obtaining from a plurality of sources vulnerability information associated with a particular security vulnerability, and aggregating the vulnerability information obtained from the plurality of sources into a unified vulnerability definition associated with the security vulnerability.

The operation of aggregating may involve converting a format of vulnerability information received from each source into a format of the unified vulnerability definition.

In some embodiments, aggregating involves determining a portion of the unified vulnerability definition based on portions of the vulnerability information received from the plurality of sources.

The operation of determining may involve detecting a conflict between vulnerability information received from different sources of the plurality of sources, and resolving a detected conflict in accordance with at least one of: a set of one or more conflict rules, and a user input.

The vulnerability information received from each source may include respective source content arranged according to a respective source format, in which case the method may also involve converting the vulnerability information from each source format into a format of the unified vulnerability definition, and determining a portion of content in the unified vulnerability definition format based on corresponding portions of source content in the converted vulnerability information received from the plurality of sources.

The method may also include providing a representation of the unified vulnerability definition.

In some embodiments, obtaining involves at least one of: requesting vulnerability information, and receiving vulnerability information.

The method may also include an operation of distributing the unified vulnerability definition to one or more vulnerability information consumers.

The operation of obtaining may involve obtaining from the plurality of sources vulnerability information associated with a plurality of security vulnerabilities. In this case, aggregating may involve aggregating vulnerability information associated with one or more respective security vulnerabilities into one or more respective unified vulnerability descriptions in accordance with an aggregation policy that specifies distribution parameters for a vulnerability information consumer, and distributing may involve distributing the one or more respective unified vulnerability descriptions to the vulnerability information consumer.

The method may be embodied, for example, in a machine-readable medium.

A Graphical User Interface (GUI) according to a further aspect of the invention includes a representation of a unified vulnerability definition associated with a particular security vulnerability. The unified vulnerability definition includes aggregated vulnerability information determined on the basis of vulnerability information obtained from a plurality of sources.

The representation may include an indication of the plurality of sources from which vulnerability information was aggregated into the unified vulnerability definition.

Another aspect of the invention provides a machine-readable medium storing a data structure. The data structure includes a unified vulnerability definition associated with a particular security vulnerability, the unified vulnerability definition comprising aggregated vulnerability information determined on the basis of vulnerability information obtained from a plurality of sources.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings.

FIG. 6 is a block diagram of a Graphical User Interface (GUI).

DETAILED DESCRIPTION OF PREFERRED EMBODIMENTS

Figure 1:
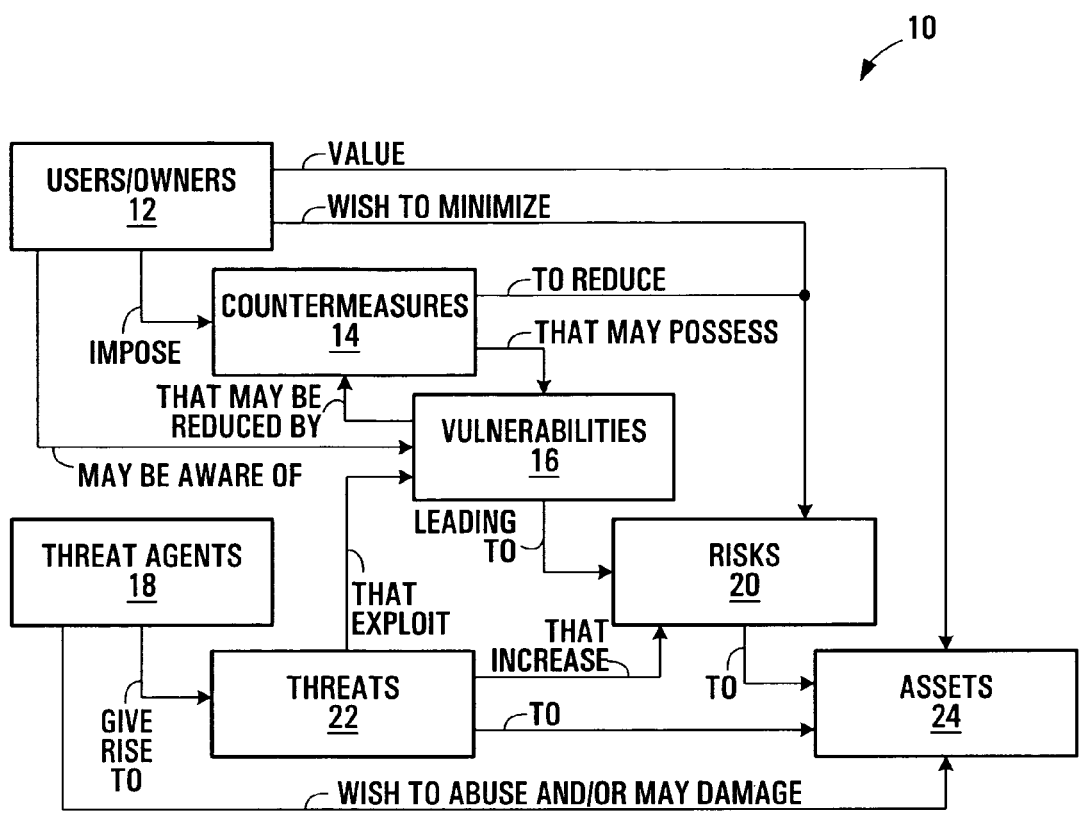
FIG. 1 is a block diagram representation of general security concepts.

FIG. 1 is a block diagram representation of general security concepts. The representation 10 shown in FIG. 1 illustrates an underlying security paradigm and derived concept based on the Common Criteria International Standard ISO/IEC 15408: 1999 for Information Technology Security Evaluation.

FIG. 1 shows users or owners 12, countermeasures 14, vulnerabilities 16, threat agents 18, threats 22, risks 20, and assets 24. Those skilled in the art will be familiar with the general security paradigm represented in FIG. 1, which is therefore described only briefly herein.

Users/owners 12 may include, for example, owners or operators of a communication network, or other stakeholders having an interest in assets 24.

Countermeasures 14 represent actions, such as upgrading an operating system or application software on a computer system asset for instance, which may be taken to reduce vulnerabilities 16. A vulnerability 16 is a condition in an asset's operation which makes it susceptible to an attack, or possibly a failure. A security hole in operating system software is one illustrative example of a vulnerability.

Threat agents 18 are parties wishing to abuse or use assets 24 in a manner not intended by their users/owners 12. A threat 22 is an indication, illustratively a probability, that an asset 24 may be harmed.

Assets 24, in the example of a communication network, are components of the network and may be either physical or logical. Vulnerabilities 16 may exist for each type of asset 24.

As shown in FIG. 1, users/owners 12 value assets, wish to minimize risks 20 to the assets 24, and may be aware of vulnerabilities 16 which lead to risks 20 to assets 24. Vulnerabilities 16 may be reduced by the users/owners 12 by imposing countermeasures 14. Inter-relations between other concepts shown in FIG. 1 will be apparent to those skilled in the art from a review thereof.

Figure 2:
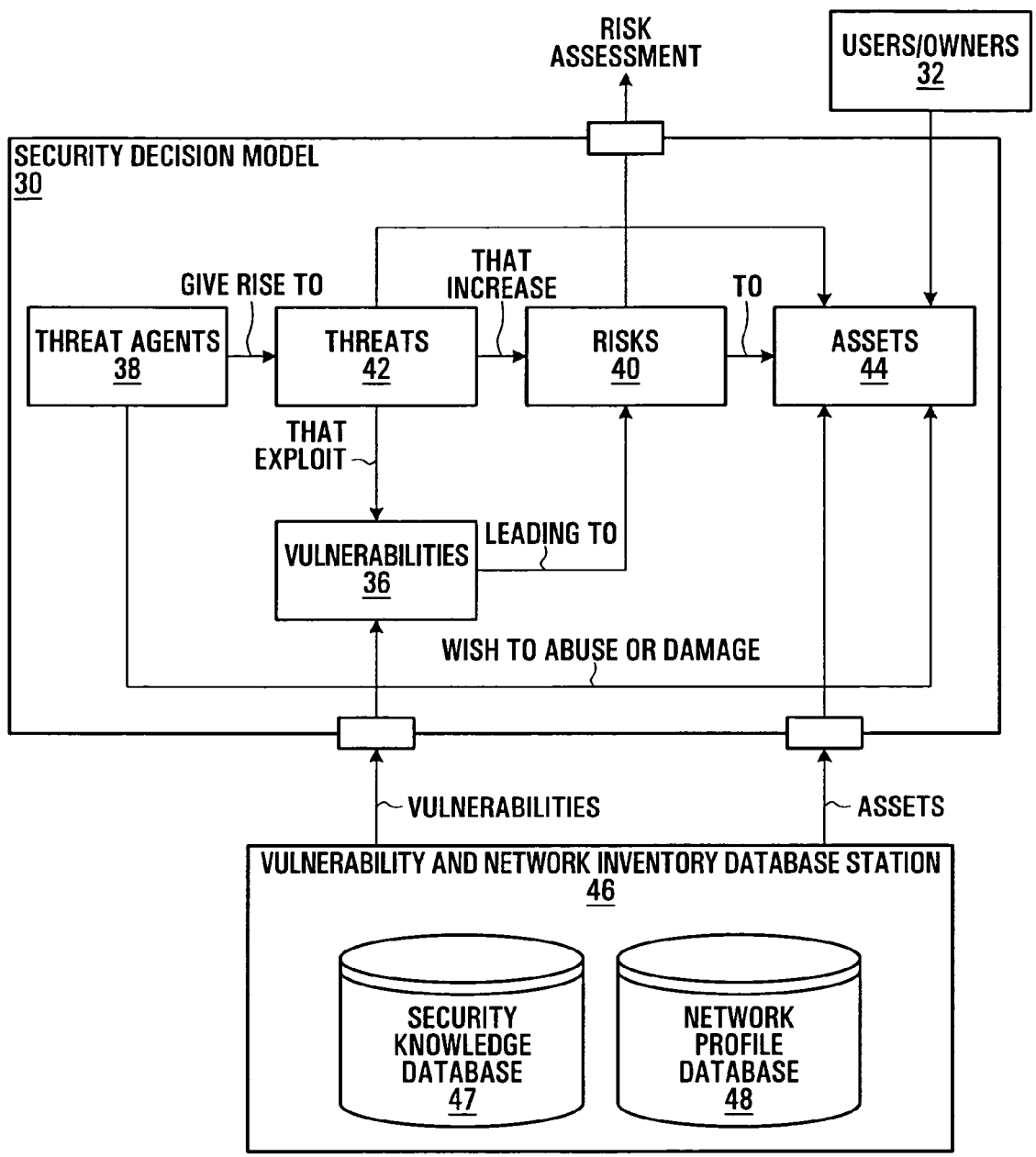
FIG. 2 is a block diagram representation of a security decision model.

An adaptation of the concepts shown in FIG. 1 and how they relate to embodiments of the present invention are represented in FIG. 2, which is a block diagram of a security decision model.

The users/owners 32, threat agents 38, threats 42, risks 40, assets 44, and vulnerabilities 36 in FIG. 2 may be substantially the same as similarly labelled components of FIG. 1, but are handled differently than in conventional techniques according to embodiments of the invention.

The vulnerability and network inventory database system 46 includes databases which store either information associated with vulnerabilities and assets or information from which vulnerability and asset information may be derived. In the example shown in FIG. 2, the database system 46 includes a security knowledge database 47 which stores information associated with known vulnerabilities or security information which is converted or otherwise processed to generate vulnerability information. The network profile database 48 stores network inventory information. Information associated with assets in a network may be obtained from the network profile database 48 or derived from information which is obtained from the network profile database 48.

Various implementations of the database system 46 will be apparent to those skilled in the art. For example, any of many different types of data storage device, such as disk drives and solid state memory devices, may be used to store the databases 47, 48. According to one particular embodiment of the invention, the databases 47, 48 are stored at a computer system which also executes software implementing the security decision model 30. It should be appreciated, however, that the database system 46 is intended to more generally represent a system through which vulnerability and asset information, or information from which these can be derived, is accessible. The databases 47, 48 may thus be remote databases which are made accessible to the model 30 through appropriate interfaces and connections. The databases 47, 48 may reside at a server in a Local Area Network (LAN), for example, in which case information is accessible through a network interface and LAN connections.

In operation, the security decision model 30 takes into account assets and vulnerabilities to determine a risk assessment. The risk assessment provides an indication of current network security state to the users/owners 32.

Figure 3:
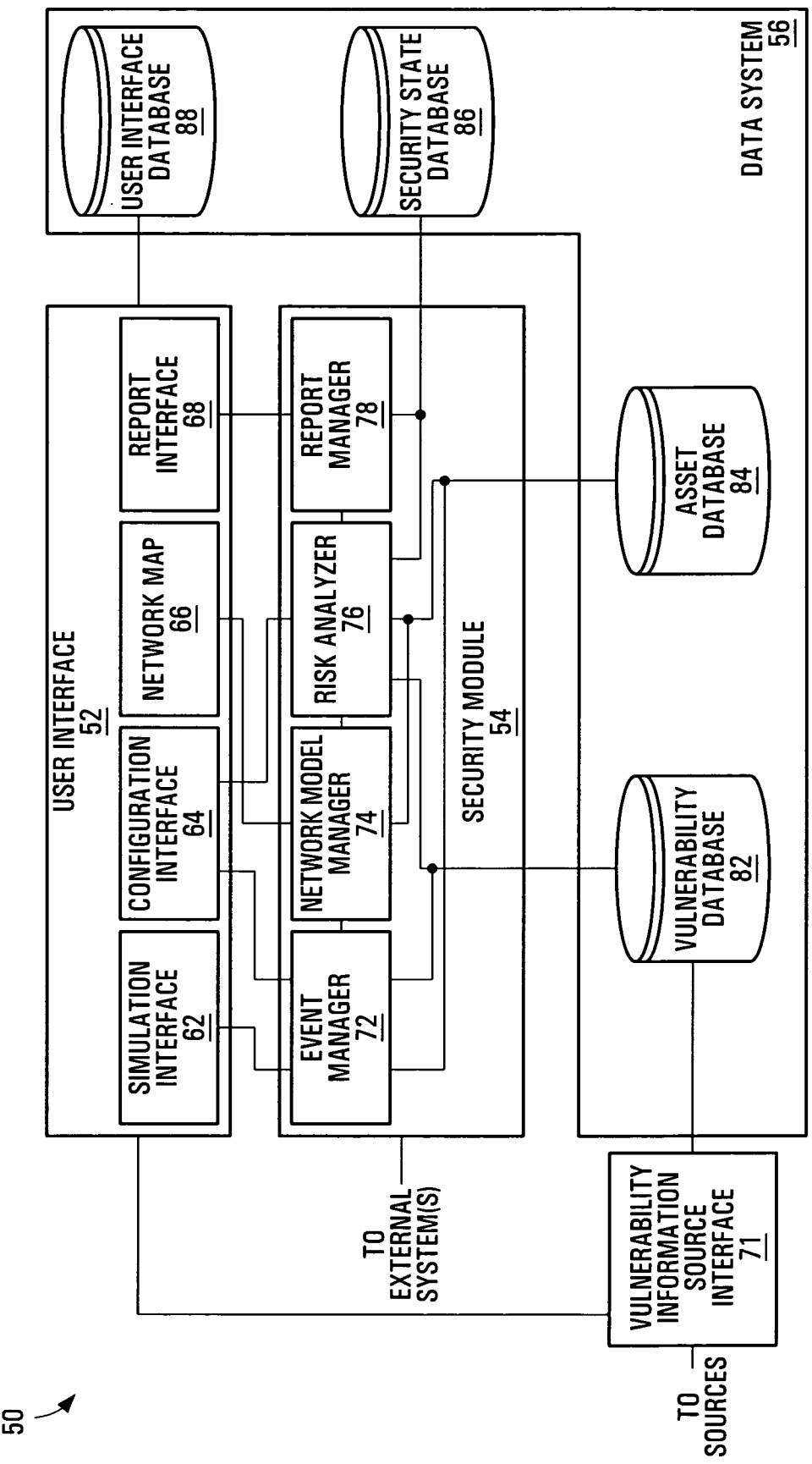
FIG. 3 is a block diagram of a security risk analysis system in which vulnerability information may be used.

The security decision model 30 may be implemented as shown in FIG. 3, which is a block diagram of a security risk exposure management system according to an embodiment of the invention.

The architecture of the system 50 includes three main elements, namely the user interface 52, the security module 54, and the data system 56. Any or all of these elements may be implemented partially or entirely in one or more computer systems. The user interface 52 might be provided through a display and input devices such as a keyboard, mouse, and/or a touchscreen, the security module 54 could be implemented primarily in software for storage in a memory of the computer system and execution by a processor, and the data system 56 could include local stores, interfaces to remote stores, or some combination thereof.

It should be appreciated that a system that uses vulnerability information may include further, fewer, or different elements, with different interconnections, than those explicitly shown in FIG. 3. For example, a security risk management system might not include every element shown in FIG. 3. A computer system or other equipment in which the system 50 is implemented may also include further elements used for other functions. A processor in a computer system would typically execute operating system software in addition to application software implementing security risk management functions for instance. Thus, FIG. 3, as well as the contents of the other drawings, are intended solely for illustrative purposes, and not to limit the scope of the invention.

In the particular example system 50 shown in FIG. 3, the user interface 52 includes a simulation interface 62, a configuration interface 64, a network map 66 and a report interface 68. These user interface elements 62, 64, 66, 68 interact with the security module 54 to accept user inputs and/or to provide outputs to users. A display, keyboard, mouse, and touchscreen represent examples of the types of input and output device through which information may be transferred between users and the security module 54. These elements may also have associated software components for execution by a processor to process and transfer input and output information.

The simulation interface 62, the configuration interface 64, the network map 66, and the report interface 68 are operatively coupled to the security module 54. The form of connections through which these elements interact is dependent upon the particular type of equipment in which the system 50 is implemented. Internal bus structures, for example, are often used in computer systems, and thus interactions between the user interface 52 and its components with the security module 54, as well as the data system 56, may be enabled through internal connections, drivers, and interfaces between a processor and various input/output devices. However, other types of connection may also or instead be used.

The security module 54 includes an event manager 72 which is operatively coupled to the simulation interface 62, to the configuration interface 64, to one or more external systems, and to the data system 56, a network model manager 74 which is operatively coupled to the network map 66, to the event manager 72, and to the data system 56, a risk analyzer 76 which is operatively coupled to the configuration interface 64, to the network model manager 74, and to the data system 56, and a report manager 78 which is operatively coupled to the risk analyzer 76, to the report interface 68, and to the data system 56. These components of the security module 54, like those of the user interface 52, may be implemented in hardware, software for execution by a processor, or some combination thereof.

The data system 56 includes a vulnerability database 82 which is operatively coupled to a vulnerability information source interface 71, to the event manager 72, and to the risk analyzer 76, an asset database 84 which is operatively coupled to the event manager 72, to the network model manager 74, and to the risk analyzer 76, a security state database 86 which is operatively coupled to the risk analyzer 76 and to the report manager 78, and a user interface database 88 which is operatively coupled to the user interface 52. These databases may be stored in any of various types of storage device, such as solid state memory devices, disk drives, and other types of storage device which use fixed, movable, or possibly removable storage media. The data system 56 may include either data stores or interfaces through which remote data stores are accessible, as noted above in conjunction with FIG. 2. Although shown separately in FIG. 3, multiple databases 82, 84, 86, 88 may be stored in one data store or memory device.

The vulnerability database 82 stores information associated with vulnerabilities. According to an embodiment of the invention, the vulnerability information source interface 71 provides vulnerability information to the vulnerability database 82. In one implementation, the interface 71 receives aggregated vulnerability information from a remote aggregation system. An operator of the system 50 might subscribe to an "Aggregation Service", to receive an aggregated feed from the aggregation system, for example. In this case, the interface 71 is effectively an output interface of an aggregator that obtains vulnerability information for particular vulnerabilities from multiple sources, applies a policy that may be user- or subscriber-specific to aggregate the vulnerability information into a unified vulnerability definition for each vulnerability, and stores the resultant unified vulnerability definition to the vulnerability database 82. According to another embodiment, the interface 71 may itself obtain and aggregate vulnerability information from multiple sources.

The interface 71 is also operatively coupled to the user interface 52 to allow a user to review and/or possibly enter or modify vulnerability information. A user might also enter or modify aggregation policies through the user interface 52. In order to avoid overly complicating the drawing, this is shown in FIG. 3 as a single connection between the interface 71 and the user interface 52. It should be appreciated, however, that the interface 71 may be operatively coupled to multiple elements of the user interface 52. In addition, an operative coupling between the interface 71 and the user interface 52 may be made through other components, such as the event manager 72, which receives user inputs through the configuration interface 64, where vulnerability information functions are provided by the security module 54. An illustrative example of an apparatus that may be operatively coupled to or provided as the interface 71 is described in detail below with reference to FIG. 4.

The asset database 84 stores information associated with assets. The vulnerability database 82 and the asset database 84 represent examples of the databases 47, 48 (FIG. 2).

The security state database 86 stores information associated with historical and/or current security risk status of a system. Information associated with the user interface 52, such as different network views and placement of icons which have been configured by a user, is stored in the user interface database 88.

Initial configuration of the system 50 for operation may involve storing vulnerability information and asset information in the databases 82, 84. Vulnerability and asset information may be manually entered by network operator personnel for example, and/or imported from an existing data store or other source. According to embodiments of the invention, vulnerability information that is stored in the database 82 includes aggregated vulnerability definitions generated by an aggregation system based on vulnerability information obtained from multiple sources. As noted above, the interface 71 may be operatively coupled to or incorporate an aggregation system. In one embodiment, the databases 82, 84 are respectively populated through the interface 71 and the event manager 72, although in some implementations each of the databases 82, 84 may be accessible through other interfaces.

The event manager 72 processes incoming events, such as initial network configuration information or changes in the network topology or configuration. Information may be received by the event manager 72 from the simulation interface 62, the configuration interface 64, or one or more external systems such as a Network Management System (NMS) of a communication network.

Through the simulation interface 62, a user may make trial or temporary changes in a network. This allows users to investigate the effects of changes, countermeasures for instance, before these changes are actually made in the network. A simulation event from the simulation interface 62 is preferably handled in a different manner than changes or updates received from other sources, so that temporary simulation changes do not affect vulnerabilities and assets which reflect actual network conditions. This may be accomplished, for example, by providing separate simulation databases to which temporary changes are applied. Simulation databases could be stored until explicitly deleted or cleared by a user, depending upon the amount of storage space available in the data system 56, or automatically deleted when a user closes or exits the simulation interface 62.

Information received by the event manager 72, from the configuration interface 64 or external system(s), which affects actual network assets may be processed and written to the asset database 84. The nature of the processing performed by the event manager 72 may be dependent on the type, format, and/or source of the information for instance.

Information entered by a user may already be formatted according to data structures used to store information in the databases 82, 84 and can be written to the databases without significant processing. In the case of information received from vulnerability sources or other external systems, however, processing such as format and/or content conversions may be performed. E-mail updates including advisories of new vulnerabilities discovered by vendors of software used in a network, for example, may be received and processed by the interface 71 or a separate aggregation system in some embodiments and used to update the vulnerability database 82. Network equipment or configuration updates received from an NMS or other systems might similarly involve processing by the event manager 72.

The network model manager 74 captures a representation of the network being analyzed from the event manager 72, the asset database 84, or both, to present the network map 66 to a user. Assets and their relationships, as specified in the asset database 84, are used by the network model manager 74 to build a model of the network. Events affecting a current network model may be passed from the event manager 72 to the network model manager 74, or stored in the asset database 84 for access by the network model manager 74. It should thus be appreciated that the network model manager 74 need not necessarily be physically connected to the event manager 72. In some embodiments, the simulation interface 62 and the configuration interface 64 may be operatively coupled to the network model manager 74 to apply changes to a model.

The risk analyzer 76 performs risk analysis and calculations. Vulnerabilities affecting assets of a communication network are determined by the risk analyzer 76, and risks in the communication network are then determined by analyzing the vulnerabilities and assets. Information associated with the vulnerabilities and assets is stored in the databases 82, 84 as noted above, and accessed by the risk analyzer 76.

Assets may include either or both of physical assets, illustratively equipment in the communication network, and logical assets such as software running on equipment in the communication network and information stored by equipment in the communication network.

Indications of risks determined by the risk analyzer 76 are provided to the network model manager 74, so that a representation of the communication network and the determined risks can be provided to a user through the user interface 52 in the form of the network map 66. The network map 66 thus includes both a representation of the network and detailed security risk information. Any of many different types and layouts of the network map 66 may be used to present results of a risk analysis. A graphical representation of a network in which assets and risks are shown using icons or images, text, or some combination thereof, may provide a most effective indication of a current security state of the network. In some embodiments, the format and layout of the network map 66 is in accordance with previously established user interface settings stored in the user interface database 88.

The system 50 is in no way limited to any particular type of representation or output. For example, indications such as alarms or warnings, which may be provided locally through the user interface 52 or transmitted to a remote system such as a pager or an e-mail client for instance, are also contemplated.

The risk analyzer 76 may also provide security risk information to either or both of the report manager 78 and the security state database 86. In FIG. 3, the risk analyzer 76 is operatively coupled to both the report manager 78 and the security state database 86. Outputs from the risk analyzer 76 may instead be provided to the security state database 86 through the report manager 78. Another possible option would be to operatively couple the risk analyzer 76 and the report manager 78 to the security state database 86. In this case, outputs from the risk analyzer 76 are provided to the security state database 86, and information in the security state database 86 is then accessed by the report manager 78 to provide reports to a user through the report interface 68.

The report interface 68 may also receive risk report selection inputs from a user for configuring reports of the risks determined by the risk analyzer 76. Risk report selection inputs may control the content, format, or both, of reports generated by the report manager 78. Responsive to risk report selection inputs received through the report interface 68, the report manager 78 accesses security risk information, in the security state database 86 for instance, and generates a customized report for a user.

It should be noted that reports or other representations of vulnerability information may also or instead be provided to a user. The report interface 68 and the report manager 78 may interact with the interface 71, the vulnerability database 82, or both, to provide to a user a representation of the unified vulnerability definition for a particular vulnerability, for instance. The GUI shown in FIG. 6 and described in further detail below is an illustrative example of one such representation.

Risk analysis functions of the system 50 may be controlled by entering risk analysis configuration information through the configuration interface 64. This may involve selecting specific types of risk calculations or parameters therefor, and/or selection of particular communication network features for analysis, for example. A user might be interested in assessing risk for a specific network asset, for a specific service provided by the network, or for a specific mission which is carried out using the communication network.

Once a service, mission, or other network feature is selected, the risk analyzer 76 determines vulnerabilities which affect the selected feature or assets in the network associated with the selected feature, illustratively by accessing the databases 82, 84. The risk analyzer 76 then determines risks to the selected feature by analyzing the vulnerabilities and assets. An indication of feature-specific risks may then be provided through the network model manager 74, the report manager 78, or both.

Details of risk analysis processes that may be performed on the basis of vulnerabilities for which information is stored in the vulnerability database 82 are provided in the three above-referenced patent applications. As embodiments of the present invention relate primarily to handling vulnerability information that may be used in these or other processes, the present application hereinafter concentrates primarily on the collection and processing of vulnerability information as opposed to its use in security risk analysis.

Figure 4:
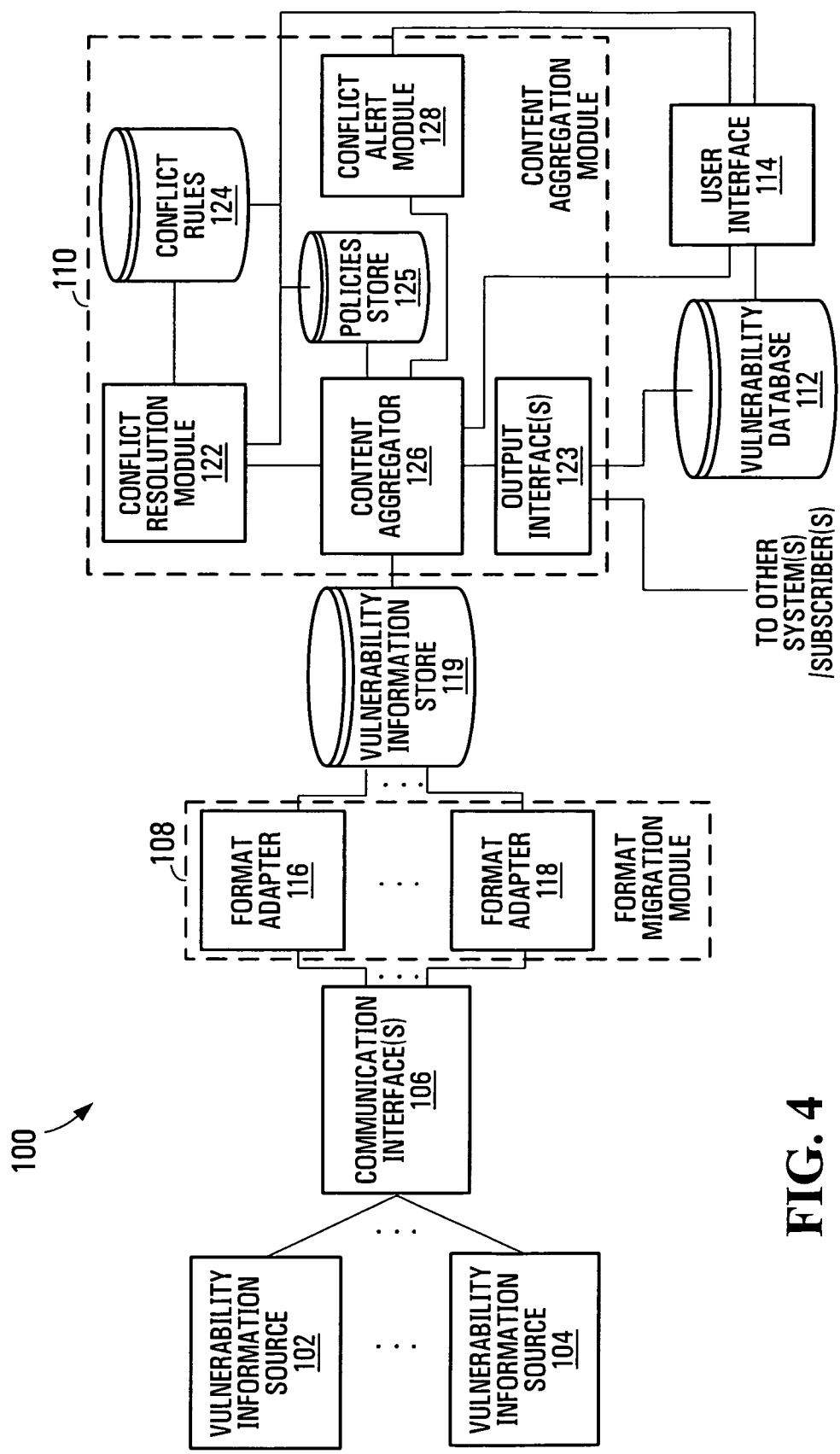
FIG. 4 is a block diagram of an apparatus implementing an embodiment of the invention.

FIG. 4 is a block diagram of an apparatus implementing an embodiment of the invention. The apparatus 100 includes one or more communication interfaces 106 for communicating with vulnerability information sources 102, 104. A format migration module 108 includes format adapters 116, 118 operatively coupled to the communication interface(s) 106 and to a vulnerability information store 119. In a content aggregation module 110, a content aggregator 126 is operatively coupled to the format adapters 116, 118 through the vulnerability information store 119, a conflict resolution module 122 is operatively coupled to the content aggregator 126 and to a conflict rules store 124, and a policies store 125, a conflict alert module 128, and one or more output interface(s) 123 are also operatively coupled to the content aggregator 126. A vulnerability database 112 is operatively coupled to the output interface(s) 123, and represents one example of a system or subscriber to which unified vulnerability descriptions may be forwarded, also generally referred to herein as a vulnerability information consumer. A user interface 114 is operatively coupled to the vulnerability database 112, to the content aggregator 126, to the conflict alert module 128, to the conflict resolution module 122, to the conflict rules store 124, and to the policies store 125.

The present invention is in no way limited to the specific components and interconnections shown in FIG. 4. Other embodiments may include further, fewer, and/or different components interconnected in a similar or different manner than shown. For example, the apparatus 100 may obtain vulnerability information from more than two sources 102, 104. In some embodiments, the user interface 114 allows other components to receive inputs from or provide outputs to a user.

The components of the apparatus 100 may be operatively coupled to each other through physical connections or through logical interconnections where any of the components are implemented using software for execution by one or more processing elements. For software-based implementations, different components may access data stored in common storage locations in a memory, for example, and may thus be considered to be coupled to each other through logical connections. The format adapters 116, 118 and the content aggregator 126 are operatively coupled together via such a logical connection, through the vulnerability information store 119.

From the foregoing, it will be apparent that many of the components of the apparatus 100 may be implemented using hardware, software, firmware, or any combination thereof. Those skilled in the art will be familiar with devices that may be used in implementing the apparatus 100, including microprocessors, microcontrollers, Application Specific Integrated Circuits (ASICs), Programmable Logic Devices (PLDs), and/or Field Programmable Gate Arrays (FPGAs), for example.

In view of the many possible implementations of the components shown in FIG. 4, these components are described herein primarily in terms of their function. Based on these functional descriptions, a skilled person would be enabled to implement embodiments of the invention in any of various ways.

The vulnerability information store 119, the conflict rules store 124, the policies store 125, and the vulnerability database 112, however, would generally be provided as data stores in a hardware component, specifically one or more memory devices. Solid state memory devices are common in some types of system, although the apparatus 100 may also or instead include memory devices for use with movable or even removable memory media.

The vulnerability information store 119 may be important, for example, where the apparatus 100 is used to implement an "Aggregation Provider". In this variant, as shown in FIG. 4, the outputs of the format adapters 116, 118 store received and re-formatted vulnerability information to the vulnerability information store 119. This allows the content aggregation module 110 to aggregate stored vulnerability information, to provide such features as supporting multiple aggregation policies stored in the policies store 125 for different vulnerability information consumers, and retro-actively aggregating existing vulnerability information when new policies are defined and/or existing policies are modified. These and other features are described in further detail below.

The conflict rules store 124 is used to store rules for resolving conflicts during content aggregation. Rule-based conflict resolution is also described below.

Where the apparatus 100 is implemented in the vulnerability information source interface 71 (FIG. 3), the vulnerability database 112 might be the vulnerability database 82. In other embodiments, the vulnerability database 112 is a remote component that is provided at a vulnerability data feed subscriber system, and not operatively coupled to the user interface 114. Another possible implementation of a vulnerability database would be a local store from which unified vulnerability descriptions generated by the content aggregator 126 are retrieved and included in one or more vulnerability data feeds that are provided to subscribers through the output interface(s) 123.

The user interface 114 will also generally be provided using physical devices such as a keyboard, a mouse, and a display. A touchscreen is one example of a device which can both receive inputs from a user and provide outputs to a user.

The communication interface(s) 106 receive vulnerability information from the sources 102, 104. The structure and function of the communication interface(s) 106 may be dependent at least to some extent upon the communication protocols used between the apparatus 100 and the sources 102, 104. For example, the communication interface(s) 106 may include a network interface for communicating with one or more remote vulnerability information sources through a communication network, a local interface for accessing previously received vulnerability information in a data store, or multiple types of interface. In one embodiment, respective communication interfaces 106 are provided to support different communication protocols or communications with groups of one or more sources 102, 104.

Vulnerability information transfer through the communication interface(s) 106 may involve either or both of "pull" and "push" operations. In a pull scheme, vulnerability sources are polled by sending requests or other messages through the communication interface(s) 106. These messages cause the vulnerability sources 102, 104 to return vulnerability information to the apparatus 100. Vulnerability information may also or instead be pushed to the apparatus 100 by one or more of the sources 102, 104 automatically, at periodic intervals for instance. The apparatus 100 may thus receive vulnerability information with or without having first transmitted some form of request.

References herein to an interface for receiving vulnerability information should be interpreted accordingly, to include one or more interfaces for communicating directly or indirectly, through a memory as noted above for instance, with vulnerability information sources to allow vulnerability information to be obtained by an aggregator.

The format migration module 108 and the content aggregation module 110 of the apparatus 100 represent one illustrative example of an aggregator according to an embodiment of the invention.

The format migration module 108 converts received vulnerability information from one or more source formats into a format of a unified vulnerability definition. In the example shown, format adapters 116, 118, which are specific to respective vulnerability information sources 102, 104, are provided. Each format adapter 116, 118 converts between the source format of one or more vulnerability information sources and the unified vulnerability definition format.

In terms of implementation, a format adapter 116, 118 may be designed as a plugin or other software code, to facilitate the addition of new vulnerability information sources as they appear over time. This would also facilitate format adapter changes or updates whenever a source changes the format in which it provides vulnerability information.

For ease of description, format conversion functions will be described below in detail primarily with reference to source-specific format adapters. It should be appreciated, however, that source-specific format adapters 116, 118 are illustrative of one embodiment of the invention. A format migration module may implement multiple-format conversion functions in other ways, without necessarily providing distinct source- or format-specific functional components.

As noted above, the format in which vulnerability information is provided may vary between different sources. One source may provide vulnerability information in a first format including a vulnerability "name", a free-form textual vulnerability "description", a listing of "affected platforms", and an "impact", whereas another source may provide vulnerability information in a second format including a vulnerability "name", a listing of "affected systems", an "effect", and a free-form textual vulnerability "description". Such source formats might be indicated using labels, tags, or other delineators in data feeds generated by each source, for example.

Each format adapter 116, 118 is operable to convert a respective source format into a unified vulnerability definition format. Format adapters may be developed by vulnerability sources based on their own source formats and a unified format specification that might be distributed by an aggregator manufacturer or vendor, for example. Vulnerability sources may also or instead distribute source format specifications to allow aggregator vendors or third parties to develop format adapters. Regardless of the format adapter development mechanism(s), portions or fields of the unified format can be mapped to portions or fields of source formats provided both the unified format and the source formats are known.

Consider a simple example of a unified format including a vulnerability "name", "platforms affected", an "impact", and a "description". These fields might be delineated in a data stream or data store by labels or tags, as noted above. A format adapter for the first format described above might map the first format "name" to the unified format "name", the first format free-form textual vulnerability "description" to the unified format "description", the first format "affected platforms" to the unified format "platforms affected", and the first format "impact" to the second format "impact".

Conversion of vulnerability information from the first format to the unified format may involve updating or overwriting labels or tags in a data stream or data store, for example. Thus, a format adapter 116, 118 might update labels or tags as it passes a received data stream to the vulnerability information store 119, store portions of vulnerability information from a received data stream into particular fields of a data structure in the vulnerability information store 119, or modify labels or tags in the vulnerability information store 119 after a received data stream has been stored.

Conversion of vulnerability information from the second format to the unified format may be accomplished in a similar manner, by mapping the second format "name" to the unified format "name", the second format "affected systems" to the unified format "platforms affected", the second format "effect" to the unified format "impact", and the second format "description" to the unified format "description".

The above examples of a first format, a second format, and a unified format have been provided solely for the purposes of illustration. Other source/unified formats are also contemplated. The particular format mapping and conversion functions will vary from those described above for different source/unified formats. For instance, source and unified formats might not necessarily completely overlap. Sources may provide different vulnerability information fields in their respective source formats. A source format may include fields that are not part of the unified format, not include all of the fields that are part of the unified format, or have some fields that have not been populated. Further variation between source formats and between source formats and a unified format are also possible without departing from the scope of the present invention.

In the apparatus 100, once vulnerability information has been translated into the appropriate format, which might not be necessary in all embodiments, and stored in the vulnerability information store 119, it is accessed by the content aggregation module 110. A primary purpose of the content aggregation module 110, and in particular the content aggregator 126, is to merge the actual source content of vulnerability information originating from different sources 102, 104 into a single, consistent, unified vulnerability definition. The unified vulnerability definition includes at least one portion of content determined on the basis of corresponding portions of source content received from multiple sources.

For numeric fields such as CVSS scores, for example, the content aggregator 126 may aggregate CVSS scores from multiple sources into a single score by determining the mean, maximum, and/or some other value based on the multiple source scores. Textual fields such as a description may be combined by concatenating text from multiple sources into a single text field, possibly with an identifier of each source from which particular text originated, or by selecting text from one particular preferred source. Preferred sources may be predetermined or configured by a user through the user interface 114, for example.

Textual fields represent one type of field for which different sources may provide conflicting vulnerability information, or more generally vulnerability information that may be more difficult to automatically aggregate. In these situations, the content aggregator 126 may trigger the conflict resolution module 122 to resolve the inconsistencies originating from different data sources. One embodiment of the conflict resolution module 122 includes a set of static conflict rules, represented in FIG. 4 as the conflict rules store 124. For example, a conflict rule may be configured by an operator through the user interface 114 to apply highest confidence to particular sources, accepting information from those sources over others. Preferred source rules may also be field-specific, where particular sources are preferred for certain types of vulnerability information.

In some cases, automated rules might not completely resolve all conflicts, and an option to allow human intervention may be provided. Where the intervention of a human operator is needed to solve a conflict or to populate a specific information field for instance, the content aggregator 126 may cause the conflict alert module 128 to issue an alert. An alert could be stored into a dedicated database for subsequent reporting through the user interface 114 and manual analysis, or provided as a user prompt through the user interface 114 for instance.

The content aggregator 126 outputs to the output interface(s) 123 a unified vulnerability definition in a unified format, including content that is based on vulnerability information received from multiple different sources. In the embodiment shown in FIG. 4, the unified vulnerability description is provided to the vulnerability database 112 through the output interface(s) 123, such that a unified vulnerability definition for a particular vulnerability may be accessed by a user through the user interface 114 and a browsing application, for example. The vulnerability database 112 may also or instead be accessed by other components such as a security risk analysis system.

The output interface(s) 123 receive unified vulnerability definitions from the content aggregator 126 and may distribute those unified vulnerability descriptions to one or more vulnerability information consumers. Like the communication interface(s) 106, the structure and function of the output interface(s) 123 may be dependent at least to some extent upon the communication protocols used between the apparatus 100 and the consumers to which unified vulnerability descriptions are provided. For example, the output interface(s) 123 might include a local interface where the apparatus 100 is implemented to feed a local vulnerability database, a network interface for communicating with one or more remote consumers, or multiple types of interface. In one embodiment, respective output interfaces 123 are provided to support different communication protocols or communications with respective groups of one or more vulnerability information consumers.

In some cases, where a source subscription mechanism is available, vulnerability information may be obtained via a push or notification mechanism. This allows the aggregator, the vulnerability database 112, and/or any other consumers served by the apparatus 100 to be updated when a new vulnerability appears, information associated with an existing vulnerability is modified, or a new source becomes available for instance. An on-demand pull sub-component may also or instead be provided to allow receiving of an instantaneous view of the current state associated with one or more vulnerability information sources. This function may be directly available through the user interface 114 or a remote consumer system, such as while a user is browsing vulnerability definitions, or pre-configured to be triggered on a scheduled basis, for example.

With respect to updating a unified vulnerability definition, it should be appreciated that vulnerability information may be received from sources at different times. The apparatus 100 might initially receive information associated with a particular vulnerability from only the source 102. The source 104 might not at that time have information associated with the vulnerability. In this case, the vulnerability information store 119 and a resultant unified vulnerability definition for that vulnerability may include information from only the source 102. When information associated with the same vulnerability is subsequently received from the source 104, after the vulnerability has been discovered and analyzed by an entity providing the source for instance, the vulnerability information store 119 and the unified definition are updated. The updated unified definition then includes information that was determined on the basis of vulnerability information that was received from different sources, albeit at different times.

The foregoing description of FIG. 4 relates primarily to aggregating vulnerability information from multiple sources into a unified vulnerability definition for one vulnerability. However, it should be appreciated that the apparatus 100 may, and likely would, perform aggregation functions for multiple security vulnerabilities. In some embodiments, the apparatus 100 is used to provide a vulnerability advisory or data feed service in which unified vulnerability descriptions associated with multiple vulnerabilities are distributed to vulnerability information consumers. The common format in which each unified vulnerability definition is provided allows a consumer to directly load a vulnerability database in a risk analysis system, for example, or to at least define a standard set of processing functions to be applied to its vulnerability information feed.

A vulnerability information consumer then benefits from having vulnerability information from multiple sources, in the form of unified vulnerability definitions that aggregate information from multiple sources, without having to support various formats in which different types of vulnerability information might be provided by those sources.

Each vulnerability information consumer may have different vulnerability information requirements. The policies store 125 provides a mechanism for managing consumer-specific policies. These policies may specify such vulnerability information distribution parameters as the frequency at which vulnerability definitions are to be transmitted to each consumer, the particular vulnerabilities for which unified vulnerability definitions are to be included in each consumer's data feed, etc. Each policy in the policies store 125 thus specifies a set of one or more distribution parameters for a particular vulnerability information consumer.

The unified vulnerability definitions to be sent to the consumers may be stored in separate per-consumer data stores in the database 112 or another database, or pushed in an aggregated data feed from the apparatus 100 to the consumers via the output interface(s) 123.

The vulnerability information store 119 may also provide advantages in terms of managing different consumer vulnerability information requirements. Consider, for example, the addition of a new client to a vulnerability data feed service provided by the apparatus 100. If the new client wishes to receive an aggregated feed of all new vulnerabilities, it is likely that the client would also wish to receive vulnerability information for all current vulnerabilities. In this case, the content aggregator 126 may detect the policy for the new client in the policy store 125 or otherwise be instructed or triggered to prepare and send a data feed to the new customer. The content aggregator 126 then retrieves existing vulnerability information from the store 119 and aggregates the vulnerability information "retro-actively".

Similar operations may be performed when a customer's profile is changed in the profiles store 125. Suppose an information system runs many different software applications, with only some being identified as "mission critical". An Instant Message (IM) server, for example, might be a low priority and therefore is not given significant consideration in a security risk analysis process. The IM server might be reachable only through a single router that is not used for anything else, for instance. In this case, vulnerabilities to the router or the IM server would basically be ignored, and as such an owner or manager of the information system would not likely require vulnerability information associated with those vulnerabilities in its data feed from the apparatus 100.

However, a new initiative or other development may affect the importance of some previously non-critical software applications of the information system. For example, if Instant Messaging were critical to a new automation initiative, then the formerly unimportant router becomes critical. Both new and past vulnerabilities to the router also become important. Responsive to an update of the profile for the customer in the profile store 125 or some other command or trigger, the content aggregator 126 retrieves existing vulnerability information from the store 119 and generates unified vulnerability descriptions for the newly important vulnerabilities. In this case, the content aggregator 126 might just repeat the whole aggregation process for all vulnerabilities required by the customer. The content aggregator 126 thereafter also includes unified vulnerability descriptions for the now important vulnerabilities in the customer's data feed.

Figure 5:
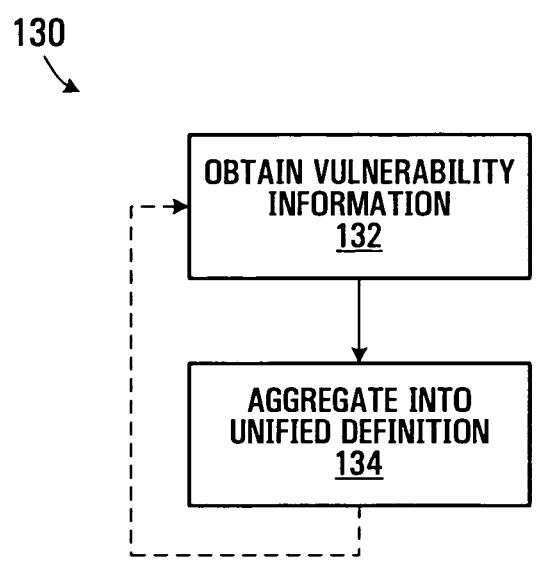
FIG. 5 is a flow diagram illustrating a method of another embodiment of the invention.

FIG. 5 is a flow diagram illustrating a vulnerability information management method. The method 130 involves obtaining vulnerability information associated with a security vulnerability from multiple sources at 132 and aggregating the vulnerability information into a unified vulnerability definition associated with the security vulnerability at 134.

The operation at 132 involves receiving vulnerability information from the sources, and may also involve requesting the vulnerability information from one or more of the sources.

Vulnerability information aggregation at 134 may involve format conversion, content conversion, or both. In some embodiments, aggregation also involves detecting conflicts between vulnerability information received from different sources, and resolving those conflicts in accordance with one or more conflict rules and/or a user input.

It should be appreciated that the method 130 is intended as one example of a method according to an embodiment of the invention. Other embodiments may involve further, fewer, or different operations, which may be performed in a similar or different order and manner than explicitly shown and described. Some variations of the method 130 and examples of additional or different operations that may be performed have been described herein, and others may be or become apparent to those skilled in the art.

For example, the unified definition associated with a vulnerability may be updated based on new or updated vulnerability information, as represented by the dashed line in FIG. 5. In one embodiment, updates may be triggered through a GUI in which a representation of the unified vulnerability definition is provided. A vulnerability information aggregator component may be integrated or otherwise operable in conjunction with a security management application, which also provides a UI component enabling a user to browse among a set of unified vulnerability definitions. A component in charge of polling vulnerability information sources may retrieve current information from those sources so that unified definitions, and thus a user's view of vulnerabilities, are kept in synchronization with vulnerability information maintained by the sources.

Although described above primarily in the context of an example apparatus and method, the present invention may be implemented or supported in other forms, including a displayed representation in a GUI or a data structure or instructions stored on a machine-readable medium, for example. A GUI and a data structure are described in further detail below with reference to FIGS. 6 and 7, respectively.

Figure 6:
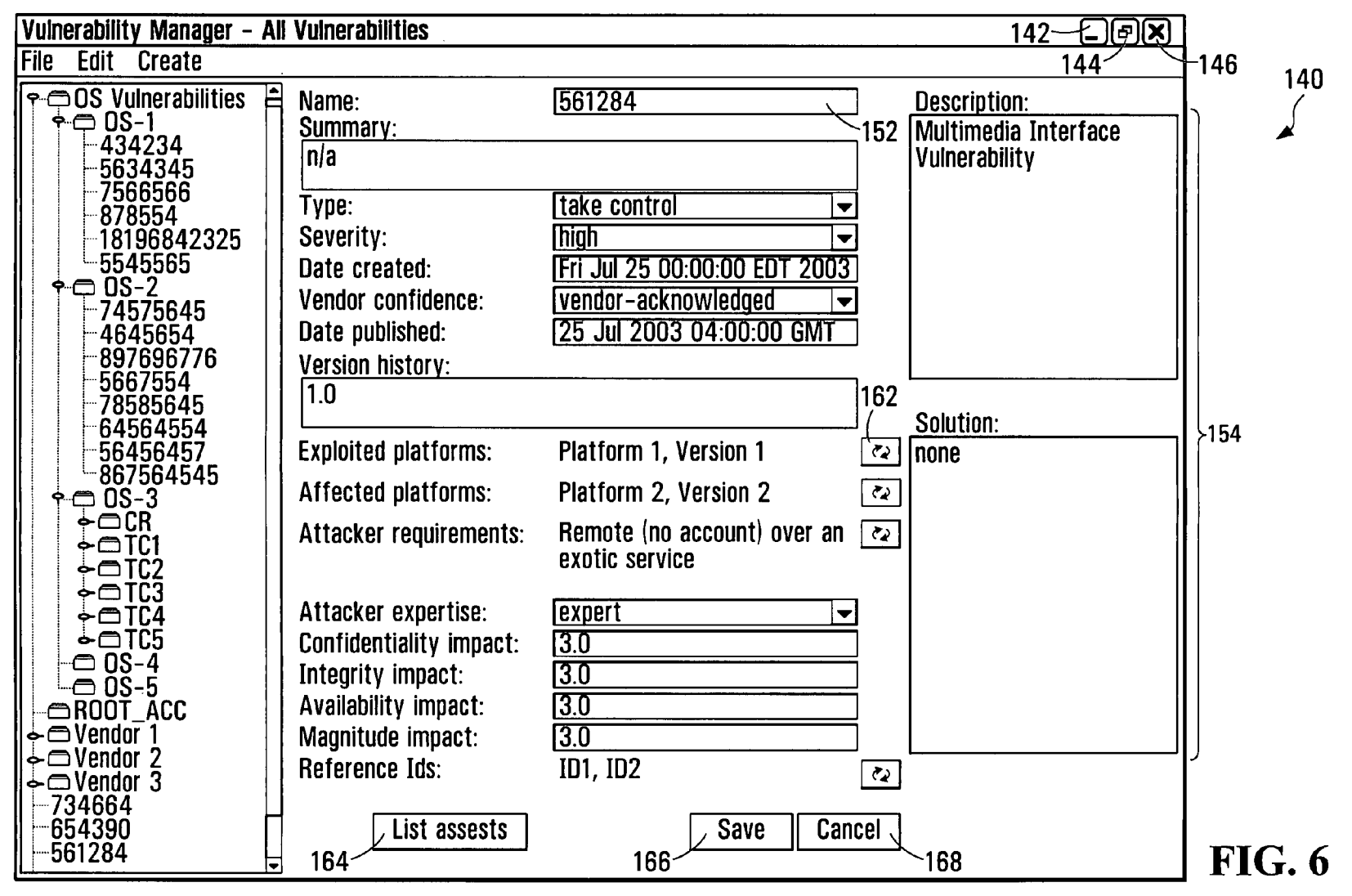

FIG. 6 is a block of a GUI that provides a representation of a unified vulnerability definition. In FIG. 6, the representation is in the form of a window 140, with common graphical elements such as a title bar, a directory tree, and minimize, maximize, and close window functional elements 142, 144, 146.

The window 140 provides a graphical representation 154 of a unified vulnerability definition associated with the security vulnerability. The representation 154 includes a graphical element 152 that identifies a particular security vulnerability and other graphical elements that similarly provide a representation of further vulnerability information in the unified vulnerability definition. As noted above, the unified vulnerability definition includes aggregated vulnerability information that was obtained from a plurality of sources. An indication of the sources from which vulnerability information was aggregated into the unified vulnerability definition are provided in the field labelled "Reference Ids".

Several possible GUI-related features are embodied in the window 140. Browsing between unified definitions for different vulnerabilities may be facilitated by the directory tree at the left hand side of the window 140. It will also be apparent that at least some fields of a unified vulnerability definition may be selected or otherwise entered by a user. Information in the "Type", "Severity", "Vendor confidence", and "Attacker expertise" fields is selectable from pull-down menus, and information for at least some other fields such as the "Description" and "Solution" fields may be editable by clicking in those fields using a mouse pointer, for example. Manual information entry may be useful to allow a user to resolve a conflict or to populate fields for which vulnerability information was not available from any sources.

Both textual and numeric fields are illustrated in FIG. 6. Each of the Confidentiality, Integrity, Availability, and Magnitude impacts is expressed numerically, whereas the "Description", "Solution", and other fields include text. These types of information may be aggregated in different ways, as described above.

Functional graphical elements may also be provided. The buttons 162 provide a function to add or remove information for the corresponding fields by launching a user interface, such as a new window dialog-box, allowing access to a selection of options for the corresponding fields. The button 164 may be selected to view any assets associated with a managed system that are affected and/or exploited by the displayed vulnerability. As will be apparent, the save button 166 allows a user save any changes made in the window 140 to a vulnerability database or store, and the cancel button 168 allows a user to cancel any changes made in the window 140 without saving those changes.

It should be appreciated that the invention is in no way limited to the particular representation, layout, fields, or types of information shown in FIG. 6. For example, a vulnerability "Name" might be in some other form than a number, such as a word or phrase that would have a meaning to a user, some fields may include "active" content such as hyperlinks, and the information to be presented in a GUI and/or characteristics of the GUI itself may be predefined or possibly configurable. In the case of a hyperlink or other active content, an aggregator might display the hyperlink and a capture of information provided at that hyperlink at a certain time, and possibly also an indication of the time at which the information was captured. The user is then able to view the information and also obtain current information from the hyperlink, if desired.

Figure 7:
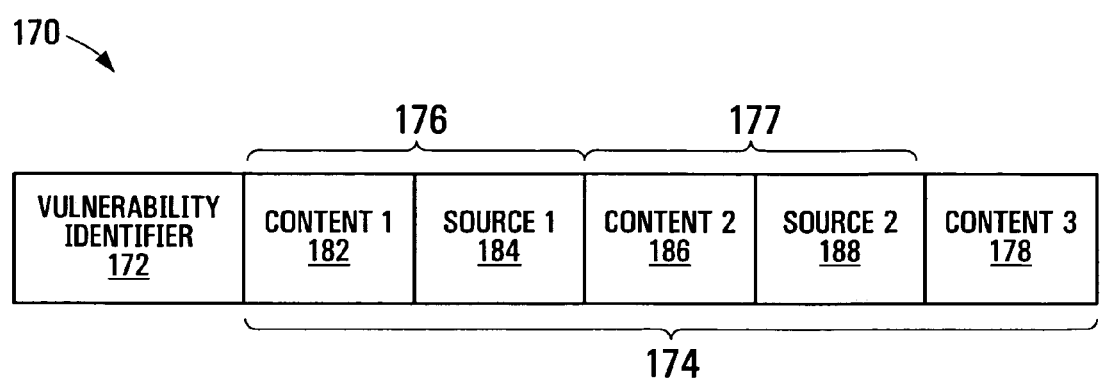
FIG. 7 is a block diagram of a unified vulnerability definition data structure.

FIG. 7 is a block diagram of an example unified vulnerability definition data structure. The data structure 170 includes an identifier 172 of a security vulnerability, and other vulnerability information 174 associated with the security vulnerability. The vulnerability information 174 includes at least some vulnerability information or content that has been determined on the basis of vulnerability information obtained from multiple sources.

The vulnerability identifier 172 may be a vulnerability name or number, for example.

As described in detail above, vulnerability information from different sources may be aggregated in any of various ways. A unified text field might include text from multiple sources, along with an identifier each source from which portions of the unified text originated. Thus, a particular field in a unified vulnerability definition might have multiple entries 176, 177 including different content 182, 186 and labels 184, 188.

A numerical field in a unified vulnerability definition might represent a mean of corresponding values provided by different sources, for example. In this case, a single value is included in a unified vulnerability definition, as illustrated at 178.

It will be apparent from the foregoing that a unified vulnerability definition data structure may include more, fewer, or different fields than those shown in FIG. 7. For instance, field labels or other delineators may be stored to differentiate between fields of a unified vulnerability definition. It should also be appreciated that an aggregator may generate and maintain unified vulnerability definitions for more than one vulnerability. A vulnerability database may thus include a data structure such as the data structure 170 for each vulnerability.

It should also be appreciated that the block diagram shown in FIG. 7 does not imply that the data structure 170 or another unified vulnerability definition data structure must be stored in contiguous locations of a storage medium.

Embodiments of the present invention may overcome many of the limitations inherent in the time consuming burden of assigning and filling in data fields associated with a vulnerability. A comprehensive approach to aggregating multiple source entries via an aggregator, which may provide a software stack of vulnerability information format adapters as described above, can ensure a consistent and accurate view of the vulnerability landscape for a managed system.

In accordance with some embodiments, vulnerability information from different sources is automatically aggregated into a unified vulnerability definition. Potential conflicts are resolved, when necessary, based on conflict rules and/or user inputs.

With a de-centralized approach, embodiments of the invention may provide near real time aggregation of vulnerability information from different remote sources. A centralized aggregation repository is also contemplated, to provide a cache storing a consolidated up-to-date view of vulnerability information sources. Whether vulnerability information is collected from remote sources and/or a centralized repository that is populated with information collected from multiple sources, the techniques disclosed herein may be used to provide a unified view of various vulnerability information databases.

Consolidation of vulnerability information originating from existing sources data feed producers addresses the more and more critical needs for automated, unified access to heterogeneous definitions and other information associated with currently known and future security vulnerabilities. According to one possible implementation, an aggregator architecture is based on a modular design, leveraging a stack of adapters that can be deployed as plugins, for example, to meet on-demand needs as vulnerability information is to be obtained from new sources.

The techniques disclosed herein can also be easily deployed on a per distributed security management application basis. This may allow vulnerability information aggregation capabilities to be integrated into distributed environments, whenever different vulnerability management applications are to share a consistent view of the vulnerability state of a managed system.

A unified vulnerability definition may provide a single consolidated and non-redundant set of vulnerability information for a particular vulnerability. Redundancy during aggregation may be avoided, for example, by detecting duplicate source content from different sources, possibly with an option to allow a user to decide whether particular portions of source content are actually duplicates, and including any duplicate source content in a unified definition only once.

Automation of this type of task is becoming mandatory as new vulnerabilities arise at a fast pace, and maintaining a consistent view of the evolution of the security state of a communication network or other managed system over time is becoming a necessity. Embodiments of the present invention allow network security administrators to have an accurate view reflecting the current state of a network in regard to vulnerability definitions.

What has been described is merely illustrative of the application of principles of the invention. Other arrangements and methods can be implemented by those skilled in the art without departing from the scope of the present invention.

For example, any of various vulnerability specifications may be used by vulnerability sources and/or aggregators, including but not limited to Application Vulnerability Definition Language (AVDL), CVE, and CVSS. Further vulnerability information options are also possible, and may be or become apparent to those skilled in the art.

In addition, the specific divisions of function shown in the drawings are intended solely for the purposes of illustration. The functions disclosed herein may be implemented using more or fewer functional blocks than explicitly shown.

The particular functions disclosed herein are similarly not to be interpreted as exhaustive. Aggregation may involve further functions that have not been specifically described. Where a vulnerability information source provides vulnerability information in the form of a bulk update for multiple vulnerabilities for instance, a format adapter or other component may parse or sort the vulnerability information.

We claim:

1. An apparatus comprising:
   an interface to receive from a plurality of sources vulnerability definition information that defines a plurality of security vulnerabilities;
   a policies store to store one or more aggregation policies, the one or more aggregation policies specifying respective sets of distribution parameters for one or more vulnerability definition information consumers;
   one or more output interfaces to enable transmission of vulnerability definitions to respective groups of the one or more vulnerability definition information consumers;
   an aggregator, operatively coupled to the interface, to the policies store, and to the one or more output interfaces, to receive the vulnerability definition information through the interface, to aggregate the vulnerability definition information that defines one or more security vulnerabilities into a respective unified vulnerability description for each of the one or more security vulnerabilities in accordance with the aggregation policy of a vulnerability definition information consumer in the policies store, and to distribute the respective unified vulnerability description for each of the one or more security vulnerabilities to the vulnerability definition information consumer through an output interface of the one or more output interfaces, wherein the vulnerability definition information received from each source comprises respective source content arranged according to a respective source format, and wherein the aggregator comprises:

a plurality of format adapters operatively coupled to the interface, the plurality of format adapters comprising respective format adapters configured to convert a format of vulnerability definition information that defines the one or more respective security vulnerabilities and is received from a respective source into a format of the one or more respective unified vulnerability descriptions; and a content aggregator operatively coupled to the plurality of format adapters and configured to determine portions of the one or more respective unified vulnerability descriptions based on corresponding portions of source content in the converted vulnerability definition information received from the plurality of sources and converted by the plurality of format adapters.

2. The apparatus of claim 1, wherein the interface comprises a plurality of interfaces, each interface of the plurality of interfaces being configured to receive vulnerability definition information from a respective group of one or more sources.

3. The apparatus of claim 1, wherein the aggregator comprises a plurality of format adapters operatively coupled to the interface, the plurality of format adapters comprising respective format adapters configured to convert a format of the vulnerability definition information that defines the one or more respective security vulnerabilities and is received from a respective source into a format of the one or more respective unified vulnerability descriptions.

4. The apparatus of claim 3, wherein the aggregator further comprises a content aggregator operatively coupled to the plurality of format adapters and configured to determine portions of the one or more respective unified vulnerability descriptions based on corresponding portions of the vulnerability definition information received from the plurality of sources and converted by the plurality of format adapters.

5. The apparatus of claim 4, wherein the content aggregator is further configured to detect a conflict where vulnerability definition information that is received from one source of the plurality of sources conflicts with vulnerability definition information that is received from a different source of the plurality of sources, and wherein the aggregator further comprises at least one of:

a conflict resolution module operatively coupled to the content aggregator and configured to resolve a conflict detected by the content aggregator; and a conflict alert module operatively coupled to the content aggregator and configured to allow a user to resolve a conflict detected by the content aggregator.

6. The apparatus of claim 4, wherein the content aggregator is further configured to detect a conflict where vulnerability definition information that is received from one source of the plurality of sources conflicts with vulnerability definition information that is received from a different source of the plurality of sources, and wherein the aggregator further comprises:

a conflict rules store to store a set of conflict rules; and a conflict resolution module, operatively coupled to the content aggregator and to the conflict rules store, configured to resolve, based on the set of conflict rules stored in the conflict rules store, a conflict detected by the content aggregator.

7. The apparatus of claim 1, further comprising:

a user interface, operatively coupled to the aggregator, for providing a representation of the respective unified vulnerability description.

8. The apparatus of claim 1, further comprising:

a vulnerability definition information store, operatively coupled to the interface and to the aggregator, for storing the vulnerability definition information that defines the plurality of security vulnerabilities, wherein the aggregator is further configured to, responsive to a change in an aggregation policy in the policies store, retrieve from the vulnerability definition information store vulnerability definition information that defines one or more respective security vulnerabilities in accordance with the changed aggregation policy, aggregate the retrieved vulnerability definition information into one or more respective unified vulnerability descriptions, and distribute the one or more respective unified vulnerability descriptions through an output interface of the one or more output interfaces to a vulnerability definition information consumer for which the changed aggregation policy specifies distribution parameters.

9. A method comprising:

obtaining, by an aggregator, from a plurality of sources vulnerability definition information that defines a plurality of security vulnerabilities;

aggregating, by the aggregator, the vulnerability definition information that defines one or more security vulnerabilities into a respective unified vulnerability description for each of the one or more security vulnerabilities in accordance with an aggregation policy that specifies a set of distribution parameters for a vulnerability definition information consumer; and distributing, by the aggregator, the respective unified vulnerability description for each of the one or more security vulnerabilities to the vulnerability definition information consumer, wherein the vulnerability definition information obtained from each source comprises respective source content arranged according to a respective source format, wherein the method further comprises:

converting the vulnerability definition information associated with the one or more respective security vulnerabilities from each source format into a format of the one or more respective unified vulnerability descriptions, wherein aggregating comprises determining portions of the one or more respective unified vulnerability descriptions based on corresponding portions of source content in the converted vulnerability definition information obtained from the plurality of sources.

10. The method of claim 9, wherein aggregating comprises converting, in respective format adapters, formats of the vulnerability definition information that is received from different sources of the plurality of sources and defines the one or more respective security vulnerabilities into a format of the one or more respective unified vulnerability descriptions.

11. The method of claim 10, wherein aggregating comprises determining portions of the one or more respective unified vulnerability descriptions based on portions of the vulnerability definition information received from the plurality of sources and converted by the format adapters.

12. The method of claim 9, wherein aggregating comprises:
   detecting a conflict where vulnerability definition information that is received from one source of the plurality of sources conflicts with vulnerability definition information that is received from a different source of the plurality of sources; and
   resolving a detected conflict in accordance with at least one of: a set of one or more conflict rules, and a user input.

13. The method of claim 9, further comprising:
   providing a representation of the respective unified vulnerability description.

14. The method of claim 9, wherein obtaining comprises at least one of:
   requesting vulnerability definition information; and
   receiving vulnerability definition information.

15. A non-transitory machine-readable medium storing instructions which when executed perform a method comprising:
   obtaining from a plurality of sources vulnerability definition information that defines a plurality of security vulnerabilities;
   aggregating the vulnerability definition information that defines one or more security vulnerabilities into a respective unified vulnerability description for each of the one or more security vulnerabilities in accordance with an aggregation policy that specifies a set of distribution parameters for a vulnerability definition information consumer; and
   distributing the respective unified vulnerability description for each of the one or more security vulnerabilities to the vulnerability definition information consumer,
   wherein the vulnerability definition information obtained from each source comprises respective source content arranged according to a respective source format, wherein the method further comprises:
   converting the vulnerability definition information associated with the one or more respective security vulnerabilities from each source format into a format of the one or more respective unified vulnerability descriptions,
   wherein aggregating comprises determining portions of the one or more respective unified vulnerability descriptions based on corresponding portions of source content in the converted vulnerability definition information obtained from the plurality of sources.

* * * * *